(12) United States Patent
Irwin

(10) Patent No.: US 9,481,312 B2
(45) Date of Patent: Nov. 1, 2016

(54) WEAPON LOCK APPARATUS

(71) Applicant: Kelly Irwin, Rogers, AR (US)

(72) Inventor: Kelly Irwin, Rogers, AR (US)

(73) Assignee: Assembled Products Corporation, Rogers, AR (US)

( * ) Notice: Subject to any disclaimer, the term of this patent is extended or adjusted under 35 U.S.C. 154(b) by 225 days.

(21) Appl. No.: 14/253,659

(22) Filed: Apr. 15, 2014

(65) Prior Publication Data

US 2014/0305175 A1    Oct. 16, 2014

Related U.S. Application Data

(60) Provisional application No. 61/812,497, filed on Apr. 16, 2013.

(51) Int. Cl.
| | |
|---|---|
| *E05B 73/00* | (2006.01) |
| *B60R 7/14* | (2006.01) |
| *F41A 23/18* | (2006.01) |
| *F41C 33/06* | (2006.01) |

(52) U.S. Cl.
CPC ............... *B60R 7/14* (2013.01); *E05B 73/00* (2013.01); *F41A 23/18* (2013.01); *F41C 33/06* (2013.01); *Y10T 70/40* (2015.04)

(58) Field of Classification Search
CPC ................................. E05B 73/00; B60R 7/14

USPC ............ 70/14, 18, 19, 57, 58, 62, 209, 232; 211/4, 8, 9, 64

See application file for complete search history.

(56) References Cited

U.S. PATENT DOCUMENTS

| | | | | |
|---|---|---|---|---|
| 3,326,385 | A * | 6/1967 | Pinkerton | B60R 7/14 211/4 |
| 4,747,280 | A * | 5/1988 | Shaw | E05B 47/0002 211/64 |
| 4,881,386 | A * | 11/1989 | Glines | B60R 7/14 211/64 |
| 4,949,559 | A | 8/1990 | Glines | |
| 5,350,094 | A * | 9/1994 | Morford | B60R 7/14 211/64 |
| 5,683,021 | A | 11/1997 | Setina | |
| 5,779,120 | A * | 7/1998 | Morford | B60R 7/14 224/311 |
| 6,584,719 | B1 * | 7/2003 | Morford | B60R 7/14 224/551 |
| 7,047,771 | B2 * | 5/2006 | Tanos | E05B 15/0046 211/64 |
| 7,478,724 | B2 * | 1/2009 | Vor Keller | F41A 17/02 211/64 |
| 8,910,560 | B2 * | 12/2014 | Irwin | F41A 23/005 211/64 |
| 8,991,224 | B2 * | 3/2015 | Zalavari | A47B 81/00 211/64 |

* cited by examiner

*Primary Examiner* — Christopher Boswell
(74) *Attorney, Agent, or Firm* — Boyd D. Cox

(57) ABSTRACT

A weapon lock apparatus having a magnetic lock system activated by a control module for releasably securing an article, such as a weapon, to deter unauthorized removal and use of the article secured by the apparatus.

18 Claims, 7 Drawing Sheets

WEAPON LOCK APPARATUS

Priority for this application is claimed from U.S. Provisional Application No. 61/812,497 entitled "Weapon Lock Apparatus" filed on Apr. 16, 2013

BACKGROUND

The present invention is directed to a weapon lock apparatus having a lock head that is controlled by a control module to deter unauthorized access to articles secured by the apparatus. The weapon lock apparatus can releasably secure a variety of articles, including a weapon. The weapon lock apparatus can be readily locked and unlocked in response to specific signals transmitted from the control module to the lock head.

There is a need for means by which the police and other safety officers can safely secure their weapons against theft and unauthorized use, yet still have ready access to the weapons. There is also a need to safely lock weapons in a home or business in order to prevent theft or unauthorized use.

Typically, weapons are mounted on a gun rack located inside a vehicle or gun cabinet. To deter unauthorized use, the weapon can be secured to the gun rack by a releasable locking bracket. When the weapon is needed, an authorized user opens the locking bracket in order to release the weapon from the gun rack.

It is known in the prior art to use an electro-magnetic device to control the lock mechanism of a locking bracket used on a gun rack. Generally, such a locking bracket is held closed around a weapon by the lock mechanism to secure the weapon on the gun mounting rack. When power is supplied to the electro-magnetic device, the locking mechanism can be opened to release the locking bracket and allow removal of the weapon from the rack. Such a device can be convenient for storing a weapon.

However, there is a major drawback to this type of lock mechanism. When an electro-magnetic lock device is used to control the lock mechanism, wires extending between the electro-magnetic lock device and a power source are typically required in order to supply power to the electromagnetic lock device. By simply cutting the wires and applying a 9-volt current, the electro-magnetic lock device will unlock the lock mechanism to allow access to a stored weapon. Such a quick and easy way to disengage a locking device on a gun mount can fail to deter unauthorized individuals from accessing said weapon.

SUMMARY

The present invention is a weapon lock apparatus having a lock head with a magnetic lock system for securing an article such as a gun in a desired location. The weapon lock apparatus can be used in combination with a gun mounting rack to releasably secure a weapon to the rack. The lock head is responsive to coded signals transmitted by a control module operable by an authorized person. Consequently, the apparatus can securely hold weapons against unauthorized removal despite tampering with the lock head.

In addition, the weapon lock apparatus includes a manual lock system that can be used as an alternative to unlock the apparatus.

It is an object of the present invention to provide a weapon lock apparatus that can secure a weapon in a vehicle or other enclosure for security purposes.

It is a further object of the present invention to provide a weapon lock apparatus for securing a weapon against unauthorized access.

It is a further object of the present invention to provide a weapon lock apparatus for a safety vehicle wherein access to a weapon is limited to authorized users.

It is a further object of the present invention to provide a weapon lock apparatus with a microprocessor-controlled solenoid that alternately locks and unlocks a magnetic lock system.

It is a further object of the present invention to provide a weapon lock apparatus having a magnetic lock system with a magnetic latching solenoid that locks and unlocks the apparatus.

In is a further object of the present invention to provide a weapon lock apparatus with a magnetic latching solenoid that is controlled by a microprocessor.

It is a further object of the present invention to provide a weapon lock apparatus with a magnetic latching solenoid controlled by a microprocessor that responds to a secure command.

It is a further object of the present invention to provide a magnetic lock system for a weapon lock apparatus that deters unauthorized access to a secured weapon.

It is a further object of the present invention to provide a magnetic lock system for a weapon lock apparatus that deters unauthorized access resulting from tampering.

It is a further object of the present invention to provide a weapon lock apparatus that controls opening and closing of a lock head using an encrypted signal.

It is a further object of the present invention to provide a weapon lock apparatus that deters theft of weapons from a safety vehicle.

It is a further object of the present invention to provide a weapon lock apparatus that deters the use of "hot wiring" techniques to gain unauthorized access to a weapon.

It is a further object of the present invention to provide a weapon lock apparatus that can be installed quickly and efficiently.

BRIEF DESCRIPTION OF THE DRAWINGS

Reference is made to the accompanying drawings in which are shown illustrative embodiments of the invention and from which novel features and advantages will be apparent.

DETAILED DESCRIPTION

Figure 1:
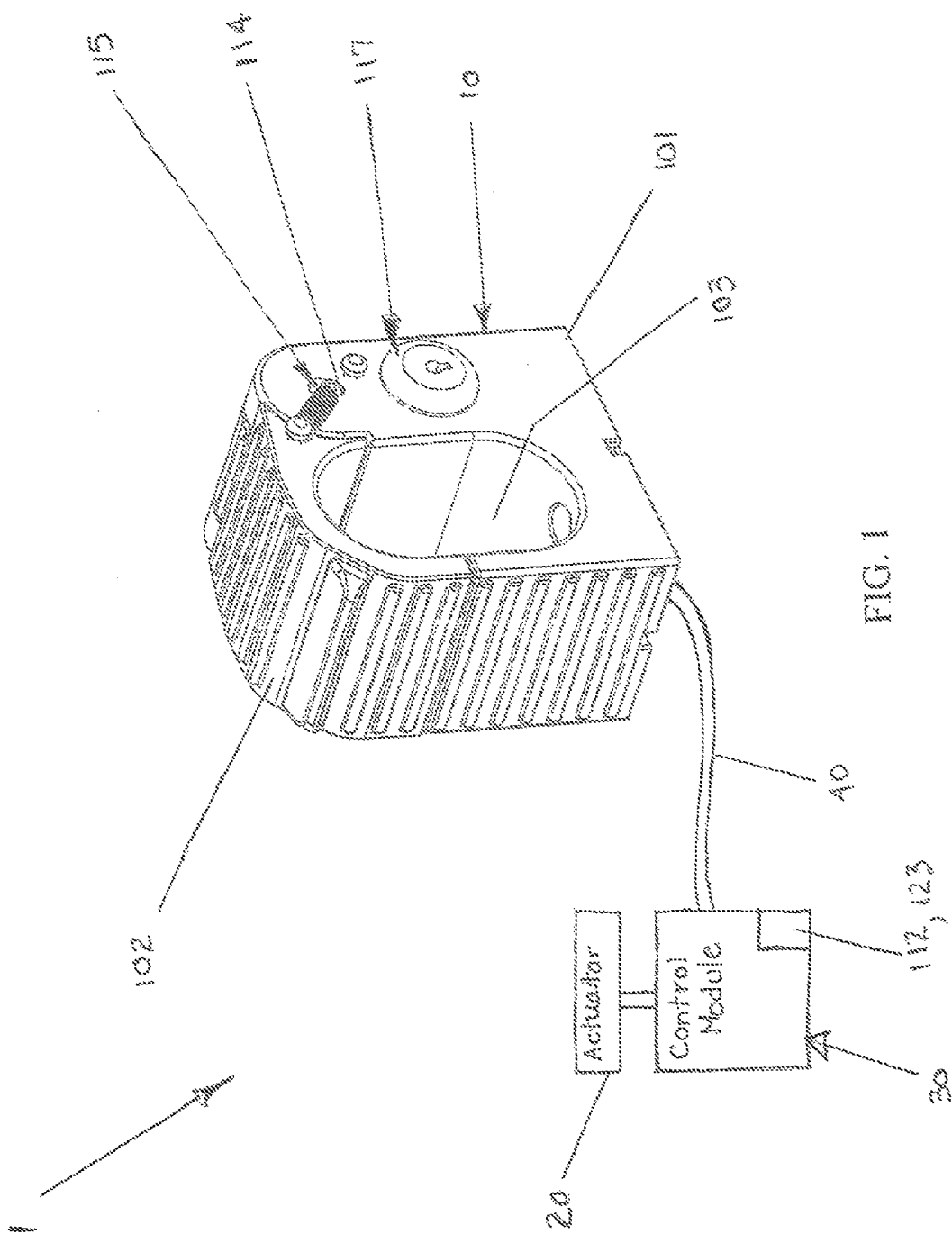
FIG. 1 is a perspective view of the weapon lock apparatus of a preferred embodiment of the present invention.
Figure 2:
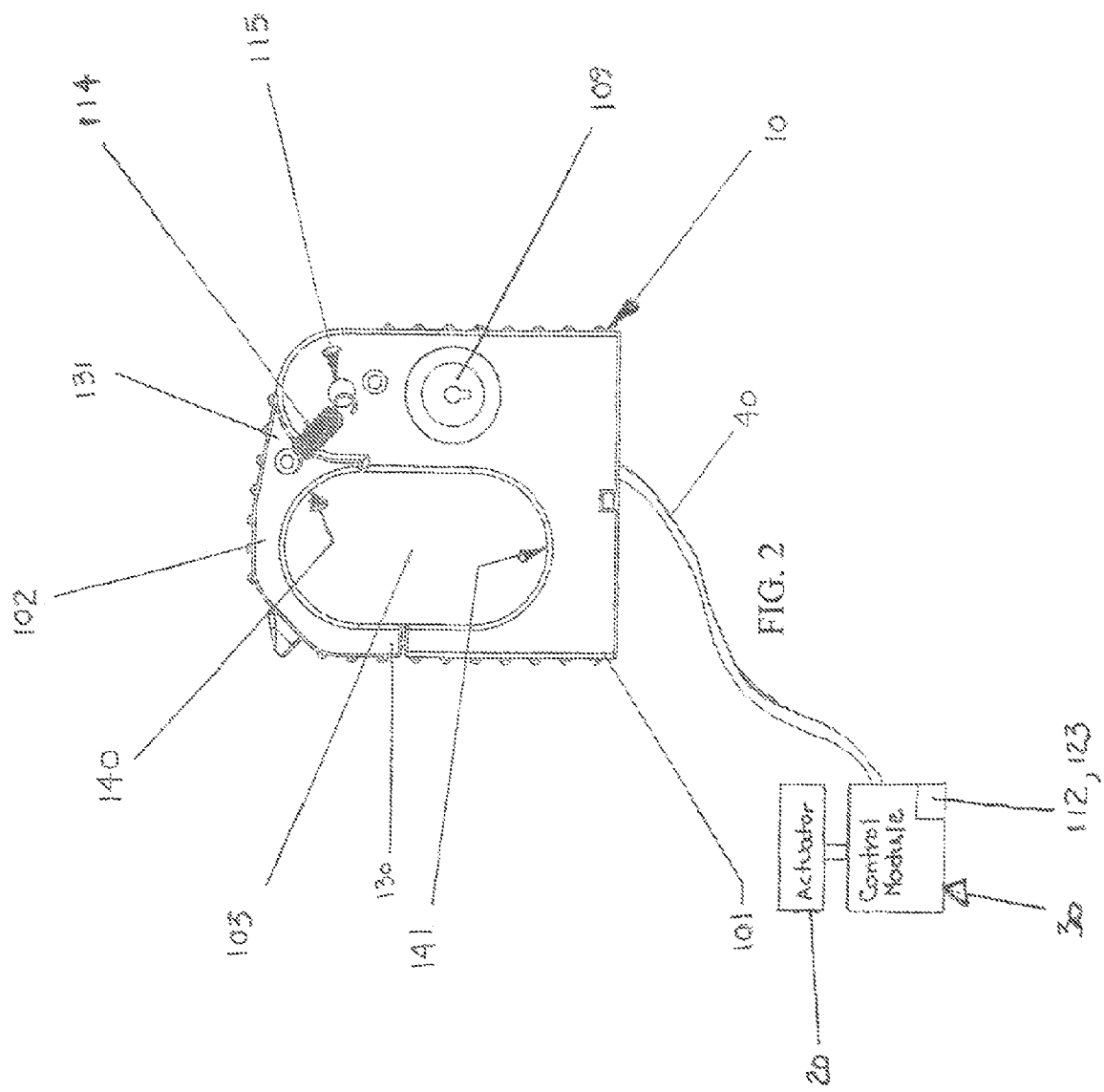
FIG. 2 is a side view of the weapon lock apparatus shown in FIG. 1.
Figure 3:
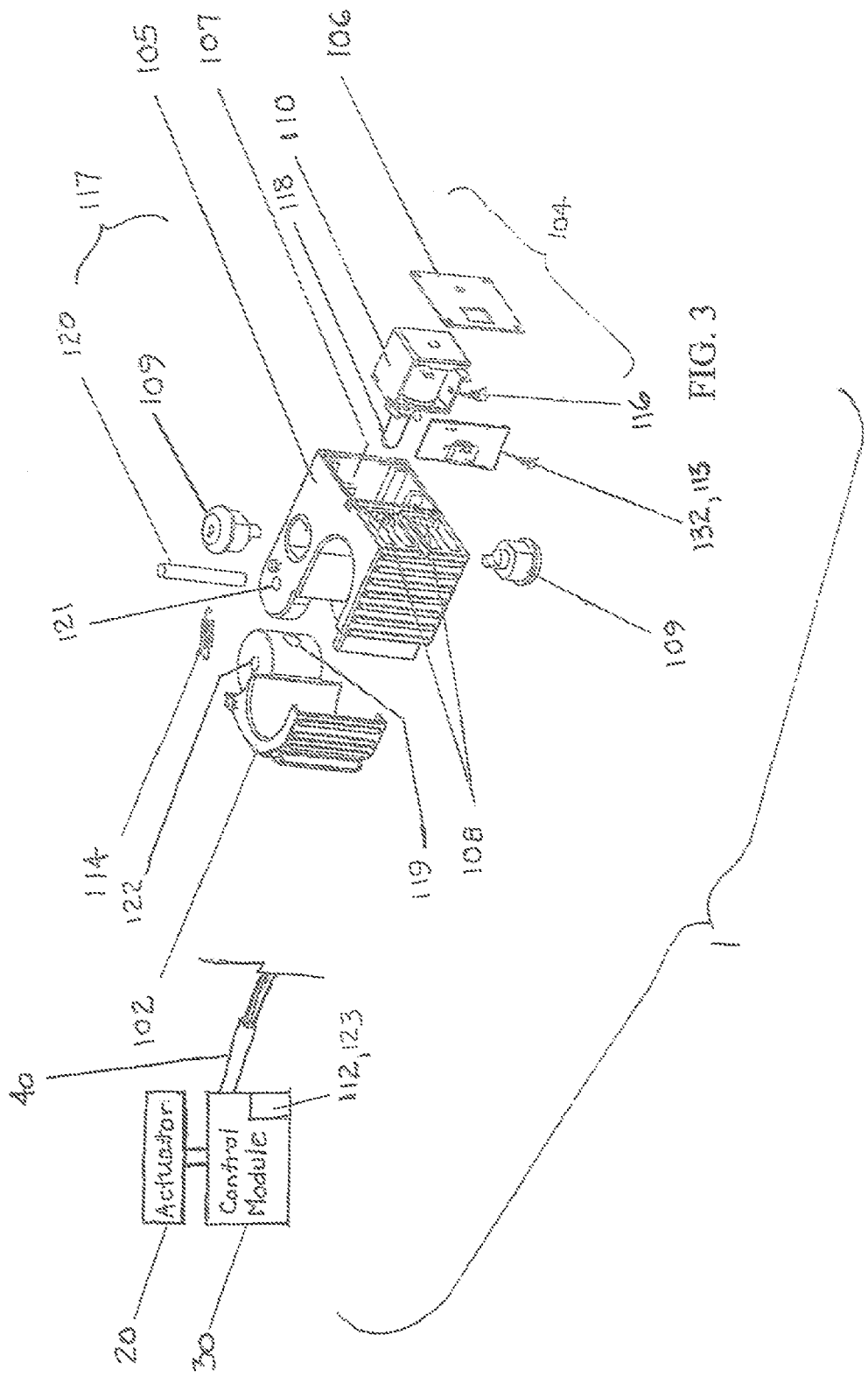
FIG. 3 is an exploded view of the weapon lock apparatus shown in FIG. 1.
Figure 4:
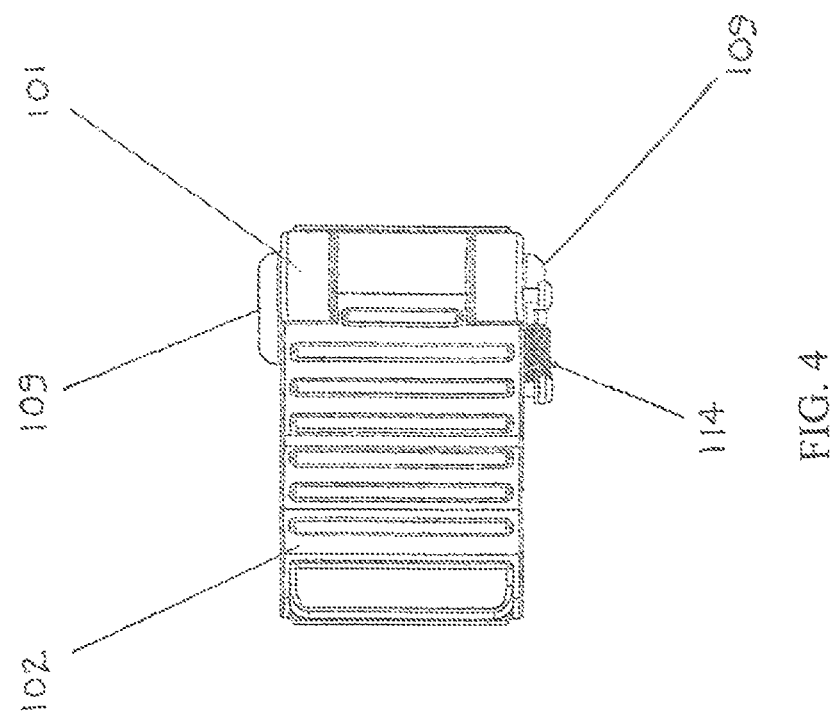
FIG. 4 is a top view of the weapon lock apparatus shown in FIG. 1.

A preferred embodiment of the weapon lock apparatus (1) of the present invention, as shown in FIGS. 1-4, includes a lock head (10), an actuator (20), a control module (30) and a cable assembly (40). The lock head (10) comprises a first microprocessor (132), a chassis (101), a latch (102), a spring (114) and a hinge (115). The first microprocessor (132) has at least one printed circuit board (113) which contains programming to control the functions of the first microprocessor (132). The lock head (10) further includes means for releasably locking the latch and means for holding an article.

Figure 5:
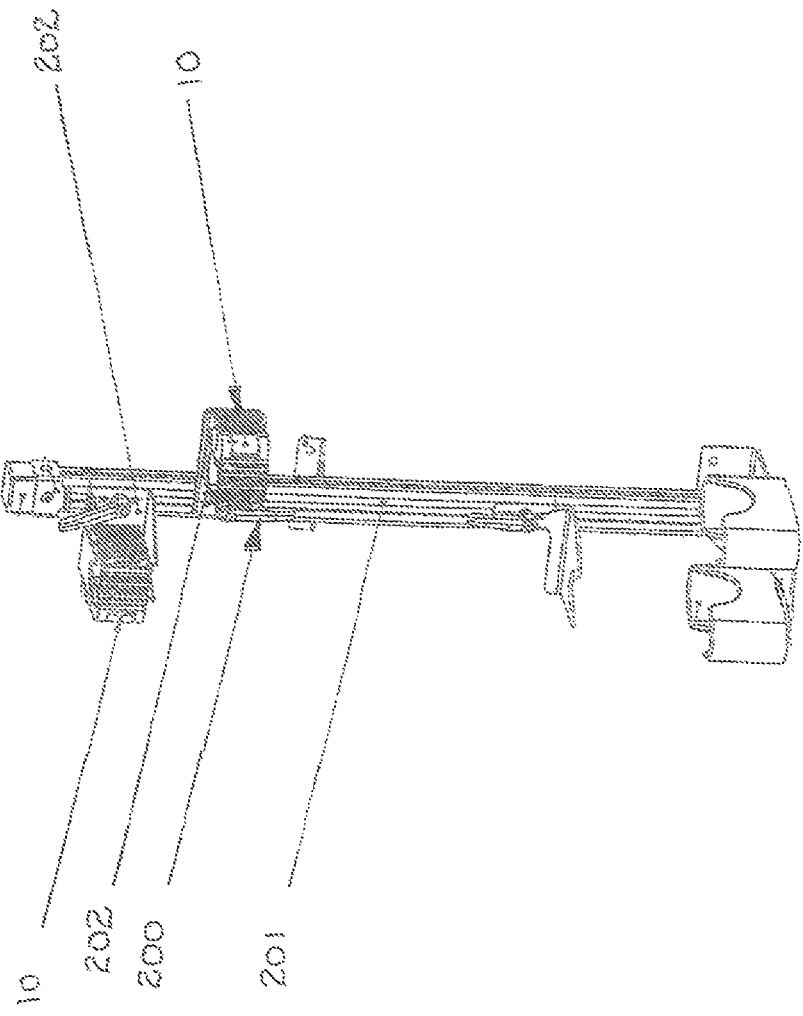
FIG. 5 is a perspective view of a pair of lock heads of the weapon lock apparatus shown in FIG. 1 in combination with a gun mounting rack.

The chassis (101) comprises a housing (105) having a base plate (106). The chassis (101) further includes an interior region (107) and means for mounting the weapon lock apparatus to a support, such as a gun mounting rack (200), as shown in FIG. 5. In the preferred embodiment, the means for mounting the weapon lock apparatus comprise a plurality of chassis mounting holes (108) disposed on the base plate (106) of the housing (105).

The latch (102) has an attached end (131) and a free end (130). The attached end (131) of the latch (102) is pivotally connected to the chassis (101) by the hinge (115). The hinge (115) allows pivotal movement between the latch (102) and the chassis (101). Preferably, the binge (115) includes a pin (120) which extends through a first aperture (121) disposed in the chassis (101) and a second aperture (122) disposed in the latch (102) and into a hollow disposed in the chassis (101) opposite the first aperture (121). The spring (114) is attached at one end to the latch (102) and at the opposite end to the chassis (101). The spring (114) is tensioned to bias the free end (130) of the latch (102) toward the chassis (101).

The latch (102) further comprises an opened position and a closed position. The weapon lock apparatus (1) further includes a locked configuration and an unlocked configuration. When the weapon lock apparatus (1) is in the locked configuration, the latch (102) is in the closed position. When the weapon lock apparatus (1) is in the unlocked configuration, the latch (102) can be alternated between the opened and closed positions.

The means for releasably locking the latch comprise a lock system (104) that includes a primary magnetic lock system (116) and a secondary manual lock system (117). The primary magnetic lock system (116) includes a magnetic latching solenoid (110) with an extensible and retractable plunger (118) and a first microprocessor (132). The first microprocessor (132) has at least one printed circuit board (113) that contains programming to control the functions of the first microprocessor (132).

The control module (30) comprises a second microprocessor (112) having at least one printed circuit hoard (123) that contains programming for controlling the functions of the second microprocessor (112).

The secondary manual lock system (117) preferably comprises a dual lock cylinder (109) that is disposed on the chassis (101). The cylinder (109) extends through the interior region (107) of the housing (105) and is accessible by a user from both sides of the chassis (101). The dual lock cylinder (109) is activated using a key (not shown).

In a preferred embodiment, the cable assembly (40) comprises at least three conductors, such as wires, extending between the control module (30) and the lock head (10). One of the conductors provides power to the lock head (10). Another conductor transmits secure, encrypted signals from the second microprocessor (112) of the control module (30) to the first microprocessor (132) of the lock head (10). The third conductor provides a ground for the weapon lock apparatus (1).

Although the preferred embodiment has a cable assembly (40) for providing power and transmitting secure signals between the control module (30) and the lock head (10), other suitable conducting means such as a wireless system could be used instead.

The latch (102) on the lock head (10) further comprises a plunger receiver (119). The plunger receiver (119) is a socket disposed proximate the attached end (131) of the latch (102). The plunger receiver (119) is sized and shaped to receive the plunger (118) therein.

The means for holding an article comprise a cradle (103). The cradle (103) includes a first arcuate portion (140) disposed on the latch (102) and a second arcuate portion (141) disposed on the chassis (101). The first (140) and second (141) arcuate portions of the respective latch (102) and chassis (101) are generally U-shaped and cooperate with each other to form the cradle (103). The cradle (103) Is generally ovate-shaped and is adapted to hold an article, such as a weapon. It is noted that the ovate-shaped cradle (103) can accommodate a variety of different types of articles. However, the shape of the cradle (103) could be varied to include circular or other geometric shapes adapted to fit a particular shape of an item to be held thereby.

In a preferred embodiment of the weapon lock apparatus (1) intended for use in a vehicle, the actuator (20) is preferably a momentary button switch. The actuator (20) functions to activate the control module (30). The control module (30) functions to activate the magnetic latching solenoid (110) to unlock the apparatus (1). Power to the control module (30) and, in turn, to the lock head (10) is supplied by the vehicle battery when the vehicle's ignition is in the "on" or "accessory" position.

To access a weapon secured in the cradle (103), an authorized user engages the actuator (20). The actuator (20) then signals the control module (30). The second microprocessor (112) in the control module (30) sends an encrypted signal to the lock head (10). The first microprocessor (132) in the lock head (10) receives the signal and checks the authenticity of the signal. If the signal is deemed to be authentic, then the first microprocessor (132) signals the magnetic latching solenoid (118) to retract the plunger (118). By retracting the plunger (118), the apparatus (1) is unlocked and the latch (102) is released to pivot open.

Although a momentary button switch is used in the preferred embodiment, other suitable actuators for activating the series of events that results in opening the weapon lock apparatus (1) can be used instead. Other suitable actuators can include a radio frequency identification (RFID) card or a biometric fingerprint recognition unit.

The chassis (101) and latch (102) are comprised of a high impact composite resin that is resistant to extreme heat and cold. Consequently, the apparatus (1) can function effectively in both warm and cold climates. In addition, the nature of the high impact resin deters vandals from breaking apart the chassis (101) or latch (102) to access a weapon secured thereby. Although the preferred material is a high impact composite resin, other suitable materials could be substituted therefor.

The power source for the weapon lock apparatus (1) when installed in a vehicle is preferably the vehicle battery. However other suitable power sources could be used instead, including a separate battery dedicated to the apparatus (1) itself. Similarly, when used in a home or business, the weapon lock apparatus (1) could be powered by a battery or wired into an available electrical system.

The latch (102) acts as a gate on the chassis (101), opening to receive or release a weapon therefrom and closing to secure a received weapon therein. The latch (102) is pivotally attached to the chassis (101) by the hinge (115).

The latch (102) can be alternated between opened and closed positions when the weapon lock apparatus (1) is in the unlocked configuration. In the opened position, the latch (102) allows a user access into the cradle (103). The latch (102) can be opened by pivoting the free end (130) of the latch (102) away from the chassis (101).

With the latch in the closed position, the free end (130) of the latch (102) is adjacent the chassis (101). The latch (102) can be secured against movement by extending the plunger (218) into the plunger receiver (119). Consequently, the latch (102) is in the closed position with the apparatus (1) in the locked configuration and access into the cradle (103) is blocked.

As previously stated, the latch (102) can be closed when the apparatus is in the unlocked configuration. However, in this case, access to the cradle (103) is possible by simply opening the latch (102) against the biasing action of the spring (114). The latch (102) is not blocked against movement in this configuration. Due to a timing function of the control module (30), discussed subsequently, the occurrence of the unlocked configuration is limited.

The plunger (118) on the magnetic latching solenoid (110) can be moved between extended and retracted positions to respectively lock and unlock the apparatus (1) as the plunger (118) is respectively engaged with and disengaged from the plunger receiver (119) on the latch (102). When retracted, the plunger (118) is withdrawn from the plunger receiver (119) and the latch (102) is free to swing open on the chassis (101). With the latch (102) opened, a weapon or other article can be removed from or placed into the cradle (103).

When extended, the plunger (118) is disposed within the plunger receiver (119), the weapon lock apparatus (1) is in the locked configuration, and the latch (102) is deterred from opening. Consequently, access to a weapon or article held in the cradle (103) is denied.

Preferably, after the plunger (118) has been retracted for a predetermined time, a timing function of the second microprocessor (112) of the control module (30) initiates a follow-up coded signal. The follow-up coded signal is sent via the second microprocessor (112) to the lock head (10) to extend the plunger (118) and thereby to return the apparatus (1) to the locked configuration. The first microprocessor (132) in the lock head (10) receives and verifies the follow-up coded signal from the control module (30). Upon verification, the first microprocessor (132) transmits a command to the magnetic latching solenoid (110) to extend the plunger (118), thereby placing the apparatus (1) in the locked configuration.

The manual lock system (117) provides an alternative method for unlocking the apparatus (1). Using a key, the dual lock cylinder (109) can be actuated to manually retract the plunger (118) from the plunger receiver (119), thereby unlocking the weapon lock apparatus (1). With the apparatus (1) in the unlocked configuration, the latch (102) can be opened to allow access into the cradle (103). It is preferred that the manual lock system (117) only be used to unlock the apparatus (1) and that locking of the apparatus (1) be accomplished by a command from the control module (30).

The cradle (103) of the weapon lock apparatus (1) is adapted for holding a weapon or various other types of articles therein. The first (140) and second (141) arcuate portions cooperate to secure at least a portion of the supported article when the apparatus (1) is in the locked configuration.

The spring (114) biases the latch (102) towards the chassis (101) so that the free end (130) of the latch (102) is continuously pulled toward the chassis (101) by the tension of the spring (114). When the weapon lock apparatus (1) is in the unlocked configuration, the latch (102) can be manually opened against the force of the spring (114).

With the apparatus (1) in the unlocked configuration, the plunger (118) is in a retracted disposition, being withdrawn from the plunger receiver (119) on the latch (102).

The housing (105) of the weapon lock apparatus (1) provides protection for the primary magnetic lock system (116) and the secondary manual lock system (117) which are both substantially contained within the housing's interior region (107). The base plate (106) covers a portion of the chassis' lower end and thereby protects the contents of the chassis (101), including the magnetic latching solenoid (110).

Regarding the primary magnetic lock system (116), the magnetic latching solenoid (110) acts to secure the latch (102) against pivotal movement in the locked configuration and also acts to release the latch (102) to allow pivotal movement in the unlocked configuration. The magnetic latching solenoid (110) is activated through a signal received from the first microprocessor (13). To unlock or release the latch (102) the first microprocessor (132) sends a pulse signal to the solenoid (110) to establish a magnetic field with a polarity that retracts the plunger (118). To lock or secure the latch (102), the first microprocessor (132) sends a pulse signal to the solenoid (110) to establish a magnetic field with a reverse polarity to extend the plunger (118).

It is noted that the solenoid (110) comprises an earth magnet which holds the plunger (118) in the retracted position when the latch (102) is unlocked. A spring in the solenoid (110) biases the plunger (118) toward the extended position and causes the plunger (118) to extend into the latch (102) when a force is applied to the plunger (118) that is sufficient to overcome the holding force of the earth magnet.

To use one preferred embodiment of the weapon lock apparatus (1), the actuator (20) is activated by a user and sends a signal to the control module (30). The control module (30) then sends an encrypted signal via the second microprocessor (112) to the lock head (10). The first microprocessor (132) on the lock head (10) receives the encrypted signal and verifies its authenticity. Upon authentication by the first microprocessor (132) of the encrypted signal from the control module (30), the first microprocessor (132) sends a command to the magnetic latching solenoid (110) to retract the plunger (118) from its position within the plunger receiver (119) in the latch (102). With the plunger (118) withdrawn from the plunger receiver (119), the apparatus (1) is in the unlocked configuration, the latch (102) is released and the latch (102) is free to be opened.

Once released, the latch (102) can then be swung away from the chassis (101), giving access into the cradle (103). With access allowed into the cradle (103), a weapon or other article can be either removed from or placed into the cradle (103).

Unlocking the apparatus (1) activates a timing function of the control module (30). After a predetermined period of time has elapsed, the control module (30) is prompted by the timing function to send a signal via the second microprocessor (112) to the first microprocessor (132) which, upon verification, causes the first microprocessor (132) to send a command to the magnetic latching solenoid (110) to extend plunger (118). The extended plunger (118) secures the apparatus (1) in the locked configuration and denies an unauthorized user access to the cradle (103).

In the event that the latch (102) is closed when the plunger (118) is extended, the plunger (118) will move directly into the plunger receiver (119) on the latch (102) and the latch (102) is immediately locked. However, if the latch (102) is opened when the plunger (118) is extended, then an outer tip of the plunger (118) engages a side of the latch (102) instead of directly entering the plunger receiver (119). When the latch (102) is closed, either manually or as a result of the biasing force of the spring (114), the plunger (118) will extend into the plunger receiver (119) due to the biasing force of its associated spring, thereby securing the apparatus (1) in the locked configuration.

In the event that a signal received the first microprocessor (132) is determined to be unauthentic, no further action to unlock the apparatus (1) occurs. The apparatus (1) remains in the locked configuration.

To use the secondary manual lock system (117), the key as inserted into either side of the lock cylinder (109) and rotated. By rotating the key, the plunger (116) on the magnetic latching solenoid (110) is retracted from the plunger receiver (119). With the plunger (118) retracted, the weapon lock apparatus (1) is in the unlocked configuration so that the latch (102) can be opened to access the cradle (103). In this preferred embodiment, the secondary manual lock system (117) is to be used in the event that power cannot be supplied to operate the lock head (10). In such embodiment, it is preferred that after the latch (102) is released using the secondary manual lock system (117), it can only be relocked by the transmission of an encrypted signal from the control module (30) to the lock head (10). Preferably, the control module (30) is programmed to send such a command to the lock head (10) at such time that power is resupplied to the control module (30) after having been off. This may occur by means of the originally provided power source or by the provision of a back-up power source, if desired.

It is noted that other suitable secondary lock systems could be provided, if desired, such as a system having a single lock cylinder or a system that enables manual locking of the latch (102), as well as the unlocking function.

Figure 6:
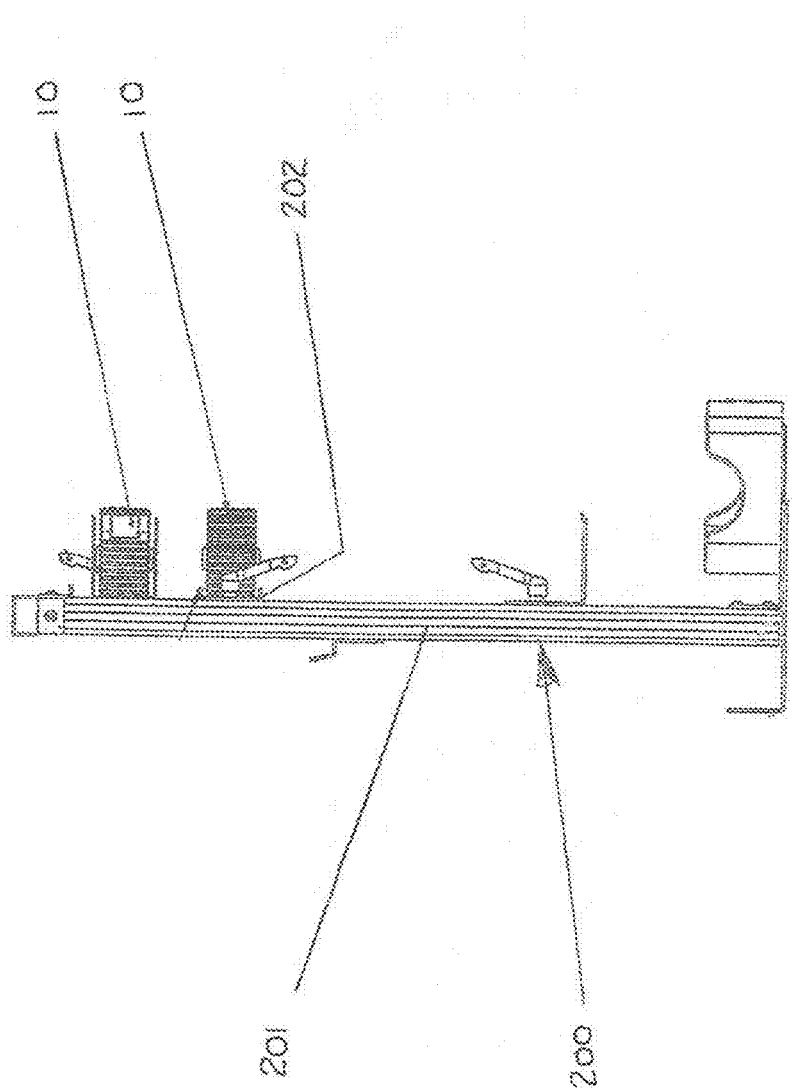
FIG. 6 is a side view of the lock heads and gun mounting rack shown in FIG. 5.
Figure 7:
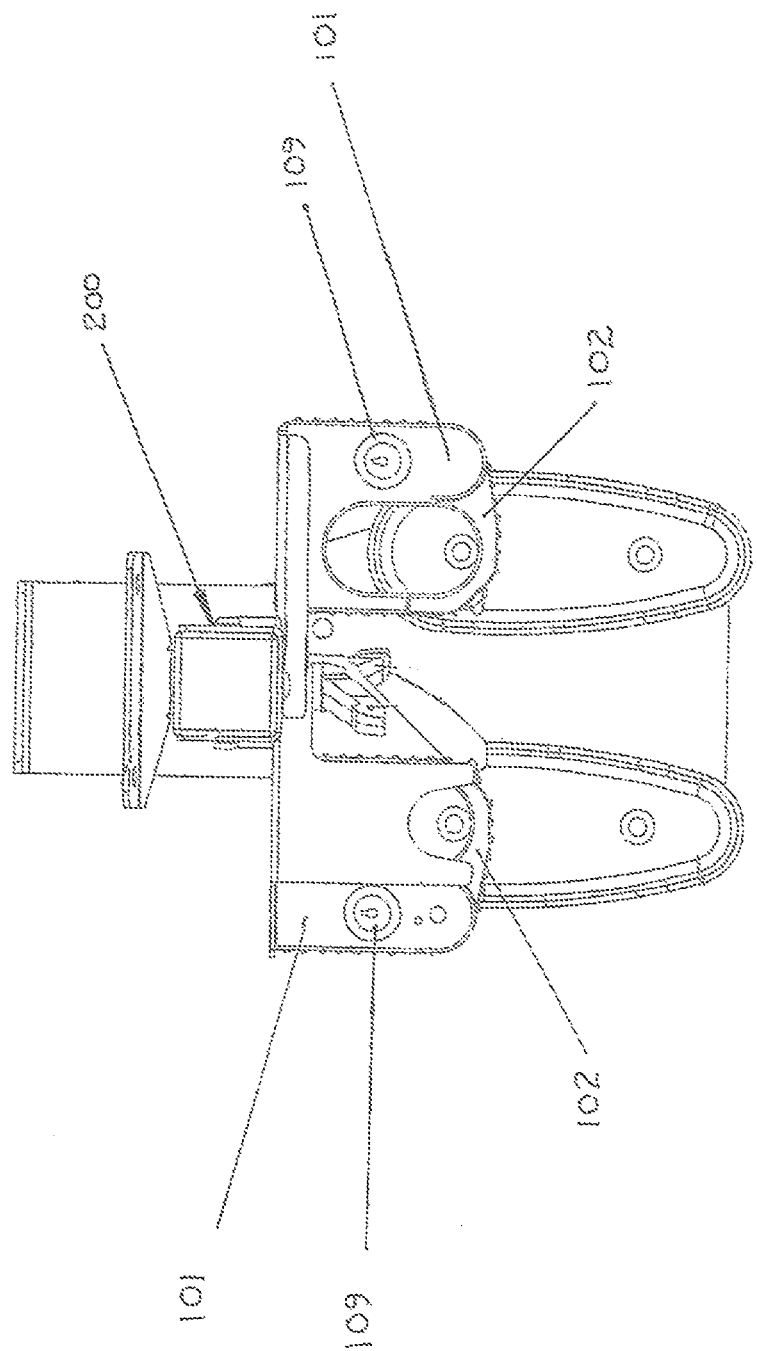
FIG. 7 is a top view of the lock heads and gun mounting rack shown in FIG. 5.

In a preferred use, the weapon lock apparatus (1) is used in combination with a support, such as the gun mounting rack (200) shown in FIGS. 5-7. Fasteners on the adjustable bracket (202) of the gun mounting rack (200) engage the mounting holes (108) on the chassis (101) in order to secure the lock bead (10) to the rack (200). One or more of the lock heads (10) can be used in combination with the gun mounting rack (200) to safely secure a weapon or weapons to the rack (200). When mounted in a vehicle, the rack (200) can support one or more weapons.

Referring to FIGS. 5-7, one preferred embodiment of a gun mounting rack (200) that can be used with the weapon lock apparatus (1) of the present invention is characterized by having a backbone (201). The backbone (201) can be mounted to the interior of a vehicle by a mounting bracket. The backbone (201) is elongated with front and rear sides and slots extending along the length of the front side.

The chassis mounting holes (108) can be used to attach the lock head (10) to an adjustable bracket (202) on the gun mounting rack (200). Each of the adjustable brackets (202) are slideably mounted onto the slots of the backbone (201) so that an attached weapon lock apparatus (1) can be positioned at various selected locations along the backbone (201) of the gun mounting rack (200), as desired. By moving the weapon lock apparatus (1) to different locations along the backbone (201), the gun mounting rack (200) can be adjusted to accommodate differently sized weapons.

Additionally, the weapon lock apparatus of the present invention can be used in combination with a gun cabinet to provide for the security of weapons in a home or business environment.

Although the present invention has been described in considerable detail with reference to certain preferred versions thereof, other versions are possible. Therefore, the spirit and scope of the appended claims should not be limited to the description of the preferred versions contained herein.

The invention claimed is:

1. A weapon lock apparatus for releasably securing a weapon against unauthorized removal from the apparatus, said weapon lock apparatus comprising:
   a lock head;
   an actuator; and
   a control module;
   said lock head includes a latch, a chassis, a first microprocessor, means for releasably locking the latch, and means for holding an article;
   said weapon lock apparatus further comprises locked and unlocked configurations; and
   said latch includes opened and closed positions, wherein in said opened position access to remove an article held in said means for holding an article is allowed, and in said closed position access to remove an article held in said means for holding an article is deterred; and
   wherein to remove an article held within means for holding an article, the actuator is activated by a user and sends a signal to the control module, the control module sends an encrypted signal to the lock head; the first microprocessor in the lock head receives the encrypted signal from the control module and verifies authenticity of the encrypted signal, when the signal is verified to be authentic, the first microprocessor sends a signal to the means for releasably locking the latch to move the weapon lock apparatus to the unlocked configuration.

2. The weapon lock apparatus of claim 1, wherein said means for holding an article comprises a cradle having first and second arcuate portions, wherein said first arcuate portion is disposed on said latch and said second arcuate portion is disposed on said chassis.

3. A weapon lock apparatus for releasably locking an article against unauthorized removal from the apparatus, the weapon lock apparatus comprising:
   a lock head;
   an actuator; and
   a control module;
   said lock head including a chassis, a latch, a first microprocessor, a cradle for receiving an article and a primary magnetic lock system;
   said weapon lock apparatus further includes locked and unlocked configurations; and
   said latch includes opened and closed positions;
   wherein when said weapon lock apparatus is in said locked configuration, said latch is in said closed position and access to said cradle is deterred, and when said weapon lock is in said unlocked configuration, said latch is moveable between said opened and closed positions to thereby allow access into the cradle; and
   wherein to remove an article held in the cradle, the actuator is activated by a user and sends a signal to the control module; the control module sends an encrypted signal to the lock head; the first microprocessor in the lock head receives the encrypted signal from the control module and verifies authenticity of the encrypted signal; when the signal is verified to be authentic, the first microprocessor sends a signal to the primary magnetic lock system to move the weapon lock apparatus to the unlocked configuration.

4. The weapon lock apparatus of claim 3, wherein when the apparatus moves into the unlocked configuration, the control module activates a timing function such that when a predetermined amount of time has elapsed, the control module sends a signal to the first microprocessor which in turn commands the magnetic lock system to return the weapon lock apparatus to the locked configuration.

5. The weapon lock apparatus of claim 3, wherein said control module comprises a second microprocessor having at least one printed circuit board, and said at least one printed circuit board controls the functions of the second microprocessor to send signals to the first microprocessor.

6. The weapon lock apparatus of claim 3, wherein said primary magnetic lock system comprises a magnetic latching solenoid.

7. The weapon lock apparatus of claim 6, wherein said latch includes a free end, an attached end, and a plunger receiver;
said magnetic latching solenoid comprises an extensible and retractable plunger; and
said plunger comprises an extended position and a retracted position;
wherein when said latch is in said opened position said free end is positioned away from said chassis, and when said latch is in said closed position, said free end is adjacent to said chassis;
wherein in the extended position the plunger is disposed within said plunger receiver of the latch and the apparatus is in the locked configuration; and
wherein in the retracted position, the plunger is removed from said plunger receiver and the apparatus is in the unlocked configuration.

8. The weapon lock apparatus of claim 7, wherein when the magnetic latching solenoid receives the encrypted signal from the first microprocessor, the magnetic latching solenoid establishes a magnetic field with a polarity that acts to retract the plunger from the plunger receiver and moves the weapon lock apparatus to the unlocked configuration.

9. The weapon lock apparatus of claim 8, wherein when the apparatus moves into the unlocked configuration, the control module activates a liming function such that when a predetermined amount of time has elapsed, the control module sends a signal to the first microprocessor, and said first microprocessor then sends a signal to the magnetic latching solenoid which in turn establishes a magnetic field with a reverse polarity to extend the plunger into the plunger receiver, thereby moving the weapon lock apparatus into the locked configuration.

10. The weapon lock apparatus of claim 7, wherein said lock head further comprises a spring that biases said latch in the closed position.

11. The weapon lock apparatus of claim 6, wherein when the magnetic latching solenoid receives the signal from the first microprocessor, the magnetic latching solenoid establishes a magnetic field with a polarity that moves the weapon lock apparatus to the unlocked configuration.

12. The weapon lock apparatus of claim 11, wherein when the apparatus moves into the unlocked configuration, the control module activates a timing function such that when a predetermined amount of time has elapsed, the control module sends a signal to the first microprocessor, and said first microprocessor then sends a signal to the magnetic latching solenoid to establish a magnetic field with a reverse polarity to move the weapon lock apparatus to the locked configuration.

13. The weapon lock apparatus of claim 3, wherein said lock head further comprises a secondary manual lock system.

14. The weapon lock apparatus of claim 13, wherein said secondary manual lock system comprises a dual lock cylinder that can be manually unlocked from either of two opposing sides.

15. The weapon lock apparatus of claim 3 wherein said weapon lock apparatus further comprises a cable assembly which includes a plurality of conductors, wherein one conductor provides power to the lock head from a power source, another conductor transmits secure signals between the first and second microprocessors, and another conductor provides a ground for the weapon lock apparatus.

16. The weapon lock apparatus of claim 3, wherein when the encrypted signal is verified by the first microprocessor to be inauthentic, said first microprocessor fails to send a signal to the primary lock system and the action of the first and second microprocessors ceases.

17. A weapon lock apparatus for releasably locking an article against unauthorized removal, said weapon lock apparatus comprising:
a lock head;
an actuator;
a control module; and
a cable assembly;
said lock head including a chassis, a latch, a first microprocessor, a primary magnetic lock system, a secondary manual lock system, and a cradle for holding an article therein;
said chassis includes a housing with a base plate and an interior region surrounded by the housing;
said chassis further includes a plurality of chassis mounting holes disposed in said base plate of said housing to mount the apparatus to a support;
said latch includes a free end, an attached end and a plunger receiver disposed proximate said attached end;
said lock head further comprises a hinge and a spring; wherein said attached end of said latch is pivotally attached to said chassis by said hinge; said spring extends between said latch and said chassis, and said spring biases said free end of said latch toward said chassis;
said primary magnetic lock system is disposed in the interior region of said chassis and said secondary manual lock system is at least partially disposed in said interior region; and
said cradle having a first arcuate portion disposed on said latch and a second arcuate portion disposed on said chassis, wherein said first and second arcuate portions are generally U-shaped;
said primary magnetic lock system comprises a magnetic latching solenoid having an extensible and retractable plunger, wherein said plunger includes an extended position in which the plunger is disposed in said plunger receiver of the latch, and a retracted position in which the plunger is withdrawn from said plunger receiver;
said first microprocessor comprises at least one printed circuit board;
said secondary manual lock system comprises a dual lock cylinder, wherein said dual lock cylinder can be manually unlocked from either of two sides;

said control module comprises a second microprocessor having at least one printed circuit board;

said cable assembly comprises a plurality of conductors, wherein one of said conductors transmits power to the lock head, another conductor transmits secure signals from the second microprocessor to the first microprocessor, and another of the conductors provides a ground for the apparatus;

wherein said weapon lock apparatus further includes locked and unlocked configurations, and said latch includes opened and closed positions;

wherein when said latch is in said opened position said free end is positioned away from said chassis, and when said latch is in said closed position, said free end is adjacent to said chassis;

wherein when said weapon lock apparatus is in said locked configuration, said plunger is disposed in said plunger receiver, said latch is in said closed position and access to said cradle is deterred; and wherein when said weapon lock apparatus is in said unlocked configuration, said plunger is disengaged from said plunger receiver, said latch is moveable between said opened position and said closed position, and access to said cradle is allowed;

wherein to remove an article from the weapon lock apparatus, the actuator is activated by a user; the activated actuator sends a signal to the control module; the second microprocessor within the control module receives the signal from the actuator; the second microprocessor sends an encrypted signal to the lock head; the first microprocessor within the lock head receives the encrypted signal; the first microprocessor verifies the received encrypted signal; when the signal from the second microprocessor is verified as authentic, the first microprocessor sends a signal to the primary magnetic lock system; the magnetic latching solenoid of the primary magnetic lock system responds to the signal by establishing a magnetic field with a polarity to thereby retract the plunger from the plunger receiver so that the weapon lock apparatus is in the unlocked configuration; and the latch is moved into the opened position by pivoting the free end away from the chassis; and the article is removed from the cradle;

wherein when the apparatus enters into the unlocked configuration, the control module activates a timing function such that when a predetermined amount of time has elapsed the second microprocessor sends a signal to the first microprocessor activating the magnetic latching solenoid to establish a magnetic field with a reverse polarity to extend the plunger into the plunger receiver and the weapon lock apparatus is returned to the locked configuration from the unlocked configuration.

18. A method for removing a weapon locked in a weapon lock apparatus, wherein the weapon lock apparatus comprises a lock head, an actuator, a control module and a cable assembly, wherein said lock head includes a first microprocessor, means for holding an article and a magnetic latching solenoid; and said control module comprises a second microprocessor, said method comprising the steps of:

activating the actuator;

sending a signal from the actuator to the control module;

sending an encrypted signal from the second microprocessor of the control module to the lock head;

verifying the authenticity of the encrypted sending a command signal from the first microprocessor of the lock head to the magnetic latching solenoid;

establishing a magnetic field having a polarity;

retracting the plunger from the plunger receiver;

moving the latch into an opened position; and removing the weapon from the means for holding an article.

* * * * *